UNITED STATES PATENT OFFICE.

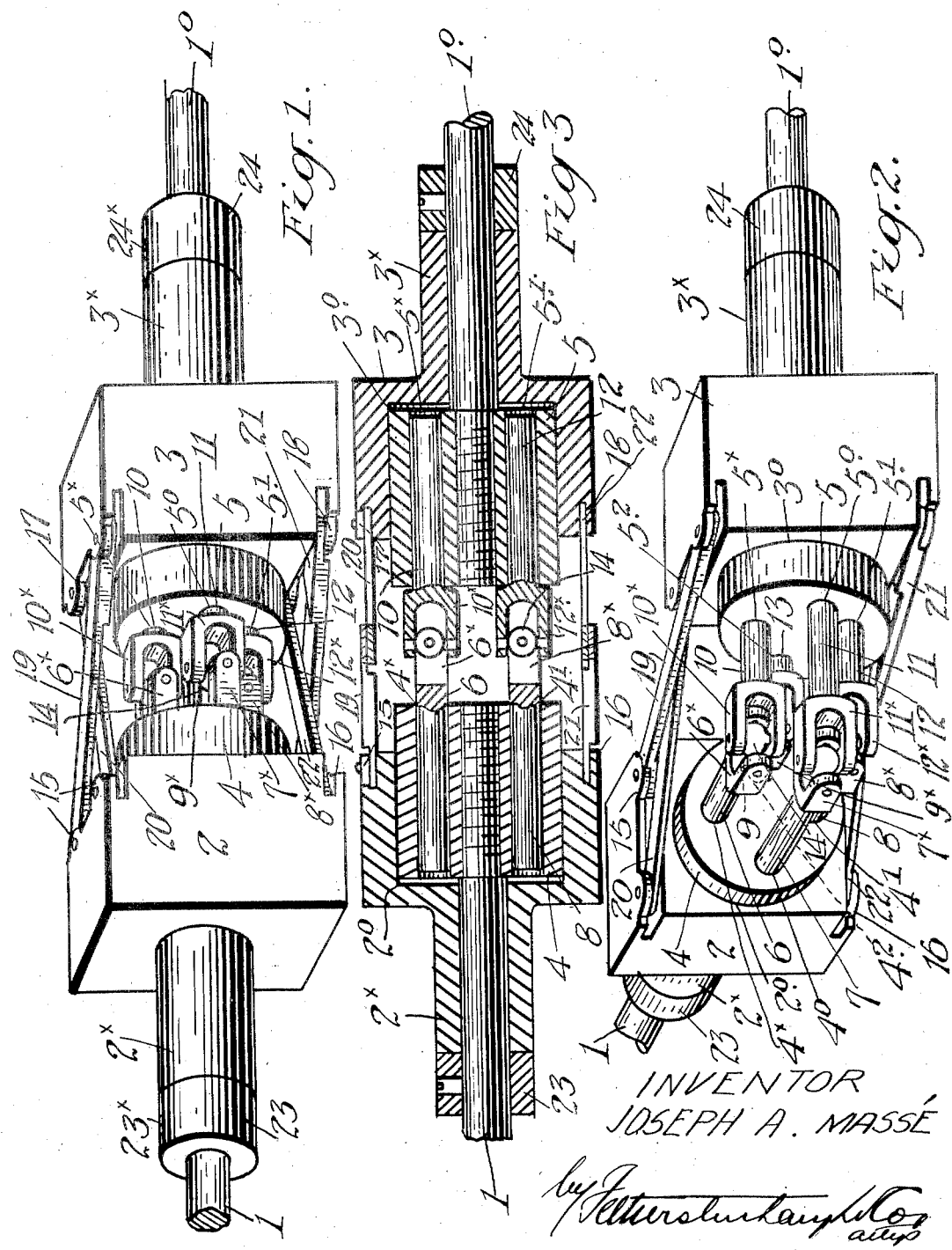

JOSEPH ALBERT MASSÉ, OF LINDSAY, ONTARIO, CANADA.

SHAFT-COUPLING.

1,334,388.  Specification of Letters Patent.  Patented Mar. 23, 1920.

Application filed May 27, 1919. Serial No. 300,030.

*To all whom it may concern:*

Be it known that I, JOSEPH ALBERT MASSÉ, of the town of Lindsay, in the county of Victoria, in the Province of Ontario, Canada, have invented certain new and useful Improvements in Shaft-Couplings, of which the following is the specification.

My invention relates to improvements in shaft couplings and the object of the invention is to devise a universal coupling by which a continuous free and even drive may be formed between the members of the shaft at any desired angle at which they are set and it consists essentially of the arrangement and construction of parts as hereinafter more particularly explained.

Figure 1, is a perspective view of my coupling showing the shaft members in a line.

Fig. 2, is a similar view to Fig. 1, showing the shaft members set at an angle one to the other.

Fig. 3, is a longitudinal section through Fig. 1.

In the drawings like characters of reference indicate corresponding parts in the various figures.

1 and 1° indicate the shaft members which it is desired to couple together. 2 indicates a head provided with a sleeve portion 2ˣ which is mounted upon the shaft member 1. The head 2 is provided with a circular recess 2°. 3 indicates a similar head which is provided with a sleevelike portion 3ˣ mounted upon the shaft member 2. The head 3 is provided with a cylindrical recess 3°. 4 indicates a cylinder which fits the recess 2° and 5 indicates a recess which fits the cylinder 3°. 4ˣ, 4° 4′ and 4² indicate a series of bores extending through the cylinder 4 and 5ˣ, 5°, 5′ and 5² indicate similar bores extending through the cylinder 5. 6, 7, 8 and 9 indicate pins slidable freely within the bores 4ˣ, 4°, 4′ and 4². 10, 11, 12 and 13 indicate pins slidable freely within the bores 5ˣ, 5°, 5′ and 5². The pins 6, 7, 8 and 9 are provided with jaws 6ˣ, 7ˣ, 8ˣ and 9ˣ and the pins 10, 11, 12 and 13 with opposing jaws 10ˣ, 11ˣ, 12ˣ and 13ˣ. The jaws 6ˣ, 7ˣ, 8ˣ and 9ˣ and 10ˣ, 11ˣ, 12ˣ and 13ˣ are connected together by universal couplings 14, the jaws being connected together in pairs.

The heads 2 and 3 are provided with upper and lower jaw portions 15 and 16 and the head 3 with upper and lower jaw portions 17 and 18, 19 and 20 indicate criss-cross links extending diagonally between the jaw portions 15 and 17. 21 and 22 indicate criss-cross links extending between the jaw portions 16 and 18. By means of the criss-cross links the heads 2 and 3 are always held definitely in a relative position during turning of the coupling from the horizontal or direct drive position shown in Fig. 1 to an angular drive position as shown in Fig. 2. As the coupling is bent to the angular position the pins 6, 7, 8 and 9 and 10, 11, 12 and 13 are drawn outward to the required relative position, the center of the universal couplings remaining definitely in the center of swing of the coupling during operation.

The inner ends of the shaft members 1 and 1ˣ are provided with internally threaded portions which extend into the cylindrical members 4 and 5 thereby connecting the shaft members 1 and 1° thereto.

23 and 24 indicate locking collars secured by set screws 23ˣ and 24ˣ to the shaft members 1 and 1° thereby holding the heads 2 and 3 definitely in position.

From this description it will be seen that I have devised a very simple form of coupling member, which will be always held in a proper relative position, the drive being exerted from one shaft member for example, from the shaft member 1 to the cylinder 4 and through the pins 6, 7, 8 and 9 and universal couplings 14 to the pins 10, 11, 12 and 13 which transmit motion to the cylinder 5, which is connected to the other shaft member 1°.

When the drive is direct, that is to say, when the shaft members 1 and 1° are in a line as indicated in Fig. 1, the pins 6, 7, 8 and 9 and 10, 11, 12 and 13 remain in the same position within the sleeve but when the drive is in an angular direction from one shaft member 1 to the other shaft member 1° each pair of pins 6 and 10, 7 and 11, 8 and 12 and 9 and 13 slide successively in and out of their corresponding bores as the cylinders 4 and 5 rotate, the pin of each pair having the same sliding movement as the other pin of the pair, the links 19, 20, 21 and 22 holding the heads 2 and 3 definitely in position so that as the coupling is bent to the angular position the center of the universal couplings is always located on a plane forming the center of rotary motion of the coupling.

It will be understood that shaft couplings have been devised before which will drive at angles within certain limits. With my device, however, the shaft couplings serve to drive at any angle, even at a right angle which, it is understood, has never been done before.

What I claim as my invention is:

1. In a shaft coupling, the combination with opposing shaft members, of a sleeve member mounted upon each shaft member and provided with heads, criss-cross links connecting the heads together, a cylindrical member mounted within each head and having a plurality of bores extending longitudinally therethrough, pins slidably held within the bores, and universal couplings connecting the pins together.

2. In a shaft coupling, the combination with opposing shaft members, of a head mounted on each shaft member having a cylindrical recess in each head, a cylindrical member turnably held within the recess having a plurality of longitudinal bores extending therethrough, pins freely held within the bores, universal coupling members connecting the opposing pins together, and a hinge connection between the heads whereby they are held at a definite position and the centers of the universal couplings held in a plane forming the center of motion of the coupling.

3. In a shaft coupling, the combination with opposing shaft members, of a sleeve member mounted upon each shaft member and provided with heads, a flexible hinge connection between the heads, a cylindrical member mounted within each head and having a plurality of bores extending longitudinally therethrough, pins slidable within the bores, and universal couplings connecting the pins together.

4. In a shaft coupling, the combination with opposing shaft members, of a sleeve member mounted upon each shaft member and provided with heads, a cylindrical member mounted within each head and having a plurality of bores extending longitudinally therethrough, pins slidable within the bores, and universal couplings connecting the pins together.

JOSEPH ALBERT MASSÉ.

Witnesses:
M. EGAN,
K. D. POGSON.